350-96.2
6/16/81    OR    4,273,412    SR

United States Patent [19]
Hillegonds

[11] 4,273,412
[45] Jun. 16, 1981

[54] OPTICAL FIBER COUPLING FITTING

[75] Inventor: Clarence G. Hillegonds, Palm Bay, Fla.

[73] Assignee: Harris Corporation, Cleveland, Ohio

[21] Appl. No.: 930,702

[22] Filed: Aug. 3, 1978

[51] Int. Cl.³ .............................................. G02B 5/14
[52] U.S. Cl. ................................................ 350/96.20
[58] Field of Search ............... 350/96.15, 96.17, 96.18, 350/96.20, 96.21; 250/227

[56] References Cited

U.S. PATENT DOCUMENTS

| | | | |
|---|---|---|---|
| 3,414,733 | 12/1968 | Wunderman | 350/96.20 X |
| 3,803,409 | 4/1974 | Prochazka | 250/227 |
| 3,999,841 | 12/1976 | Dakss et al. | 350/320 |
| 4,030,811 | 6/1977 | Khoe et al. | 350/96.17 |
| 4,060,309 | 11/1977 | Le Noane et al. | 350/96.18 |
| 4,075,477 | 2/1978 | Hanson | 250/227 |
| 4,101,197 | 7/1978 | Kent et al. | 350/96.17 |
| 4,118,105 | 10/1978 | Voigt | 350/96.20 |
| 4,119,363 | 10/1978 | Camlibel et al. | 350/96.20 |
| 4,181,401 | 1/1980 | Jensen | 350/96.21 |

FOREIGN PATENT DOCUMENTS

| | | | |
|---|---|---|---|
| 1438016 | 6/1976 | United Kingdom | 350/96.21 |
| 1486681 | 9/1977 | United Kingdom | 350/96.20 |

OTHER PUBLICATIONS

Uberbacher, "Optical Connection For LSI Electrical Circuits", *IBM Tech. Discl. Bull.*, vol. 18, No. 2, Jul. 1975, pp. 485-486.

*Primary Examiner*—John K. Corbin
*Assistant Examiner*—John D. Lee
*Attorney, Agent, or Firm*—Craig and Antonelli

[57] ABSTRACT

An optical fiber coupling fitting includes a clamping member, a central portion of which is removed for receiving an optical fiber holder which is inserted into the central hole portion. Transverse to a slot in the clamping member is a tapped bore for receiving a screw by which the distance between the opposite faces of the slot may be reduced, thereby reducing the area of the central hole portion of the clamping member and causing clamping engagement between the walls of the hole and the outer surface of a larger diameter end of the optical fiber holder. Loosening of the screw releases the clamping engagement between the walls of the hole and the optical fiber holder so that the fiber holder may be adjusted in a direction parallel to the axis of the optical fiber.

The clamping member is affixed to a mounting block, which retains the optical element, by means of a plurality of screws passing through holes in the clamping member and engaging threaded holes in the mounting block. Loosening of these plurality of screws permits the position of the clamping member relative to the optical element retained in the mounting block to be adjusted, in order to properly align the optical fiber with the light coupling face of the optical element.

13 Claims, 9 Drawing Figures

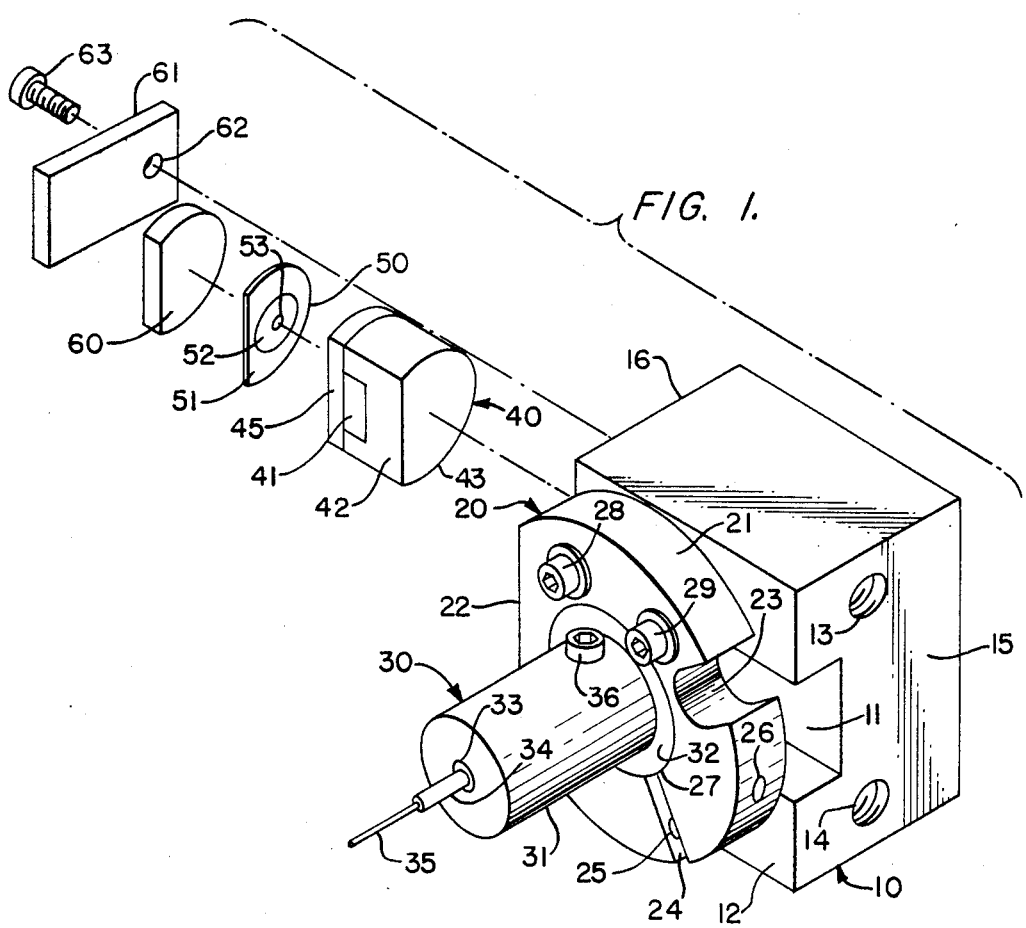

OPTICAL FIBER COUPLING FITTING

FIELD OF THE INVENTION

The present invention relates to an arrangement for connecting a light conducting fiber or filament to the light coupling face of an optical element such as a light receiving photodiode or a light transmitting laser diode. In particular, the present invention is directed to an optical fiber coupler fitting which facilitates the connection and disconnection of both the optical element to which the fiber is coupled and the fiber itself, while achieving the required alignment between the fiber and the element without the need for adjustment whenever a connection replacement is effected.

BACKGROUND OF THE INVENTION

The recent development of optical telemetry systems has seen a significant reduction in the size of system components, such as light emitting devices, light receiving elements, and the optical conductive highways by way of which an optical transmitter and an optical receiver may be coupled to one another. Typically, the communication path is in the form of an optical fiber or filament, the ends of which are coupled with the light transmitting and receiving elements, respectively. In order to assure maximum optical coupling between the ends of the fiber and the optical devices to which they are coupled, it is important to precisely fix the axial distance between the end of the optical fiber and the face of the optical element to which it must be coupled, and to accurately align the end of the fiber with a prescribed location on the surface of the element. In addition, it is desirable that the coupling fitting permit rapid replacement of the optical fiber relative to the optical element.

Examples of optical fiber coupler fitting arrangements which have been proposed to facilitate alignment and replacement of the coupled components are described in U.S. Pat. No. 4,060,309 to LeNoane et al and British Pat. No. 1,438,016 to Hennell et al. Basically, each of these arrangements is of tubular or cylindrical configuration with an optical fiber retained in an inner cylindrical sleeve member which, in turn, is inserted into an outer tubular member. A threaded retaining element is frictionally urged against the inner member to hold the fiber and inner element within the outer member. Alignment is to be achieved by a plurality of set screws provided in a tubular body into which the inner and outer cylindrical members are inserted, the set screws engaging the outer surface of the outer cylindrical member and being adjusted to orient the axis of the optical fiber relative to the surface of the light receiving or emitting element. Additional disclosures of optical fiber fitting arrangements may be found in the U.S. Pat. Nos. to Prochazka 3,803,409, Sato 3,936,143, Dakss et al 3,999,841 and IBM Technical Disclosure Bulletin Vol. 18, No. 2, July 1975, pages 485 and 486 in an article by E. C. Uberbacher, entitled "Optical Connection for LSI Electrical Circuits".

Unfortunately, devices of the type described in the above literature, including those which purport to achieve fiber-element alignment, while permitting relative replacement between the two, are bulky and complex, thereby incurring a high cost of manufacture and departing from the compact size needed for practical application to present day optical system components.

SUMMARY OF THE INVENTION

In accordance with the present invention, there is provided an improved optical fiber coupler fitting which is both compact and structurally simplified, while enabling an optical fiber to be accurately aligned with the light transmitting or receiving surface of an optical element, such as a light emitting laser diode or photosensitive diode. Moreover, once proper alignment of a clamping member portion of the fitting with the optical element has been achieved, subsequent rapid replacement of the optical fiber can be effected without loss of alignment.

For this purpose, the clamping member is configured as a slotted thick disc, a central portion of which is removed for receiving an optical fiber holder. The holder is cylindrical with one end of larger diameter being inserted into the central hole portion of the disc. Transverse to a slot in the disc is a tapped bore for receiving a screw. As the screw is tightened into the tapped bore, the distance between the opposite faces of the slot is reduced, thereby reducing the area or size of the central hole portion of the disc and causing clamping engagement between the walls of the hole and the outer surface of the larger diameter end of the optical fiber holder. Loosening of the screw releases the clamping engagement between the walls of the hole and the optical fiber holder so that the fiber may be adjusted in a direction parallel to the axis of the optical fiber.

The fiber itself is inserted into a protective ferrule which is held in a channel provided along the axis of the holder and retained in the channel by way of a set screw provided in the holder. The clamping member is affixed to a mounting block, which retains the optical element, by means of a plurality of screws passing through holes in the clamping member and engaging threaded holes in the mounting block. The diameter of these screw holes in the clamping member is larger than the diameter of the screw threads, thereby providing a certain degree of play or slop. The axes of the screw holes are parallel to and surround the axis of the optical fiber channel of the fiber holder when retained in the clamping member. Loosening of these plurality of screws permits the position of the clamping member relative to the optical element retained in the mounting block to be adjusted, in order to properly align the optical fiber with the light coupling face of the optical element. Once this proper alignment has been achieved and the screws are tightened, proper alignment with an optical fiber that may be inserted and held in the clamping member is assured without the need for repeating the axis alignment procedure.

The manner in which the optical element is retained in the mounting block may vary depending upon the type of optical element to be used. Where the optical element comprises a cylindrically-shaped photodiode, the light receiving surface of which constitutes one end face of a cylinder, a corresponding cylindrical well or slot may be provided in a surface of the block opposite to that receiving the clamping member, so that the photodiode may be inserted into and retained in the mounting block and abut against the optical fiber. Similarly, where the optical element comprises a laser diode configured as a partially flattened cylinder, a correspondingly configured partially flattened hole, transverse to the clamping member receiving face of the block, may be provided for insertion of the laser diode into the block. In either exemplary configuration, a rectangular slot is provided in the clamping member receiving face of the mounting block to provide a viewing aperture through which visual access to the fiber-/optical element interface may be achieved, so that proper alignment of the end of the optical fiber and the face of the optical element may be observed, as by the use of a suitable viewing instrument such as a microscope objective.

BRIEF DESCRIPTION OF THE DRAWINGS

FIG. 1 is a partially exploded pictorial view of an optical fiber coupler fitting for coupling an optical fiber to an injection laser diode;

FIGS. 2 and 3 are respective front and side views of a mounting block for holding a partially flattened, cylindrically shaped, injection laser diode;

DETAILED DESCRIPTION

Figure 4:
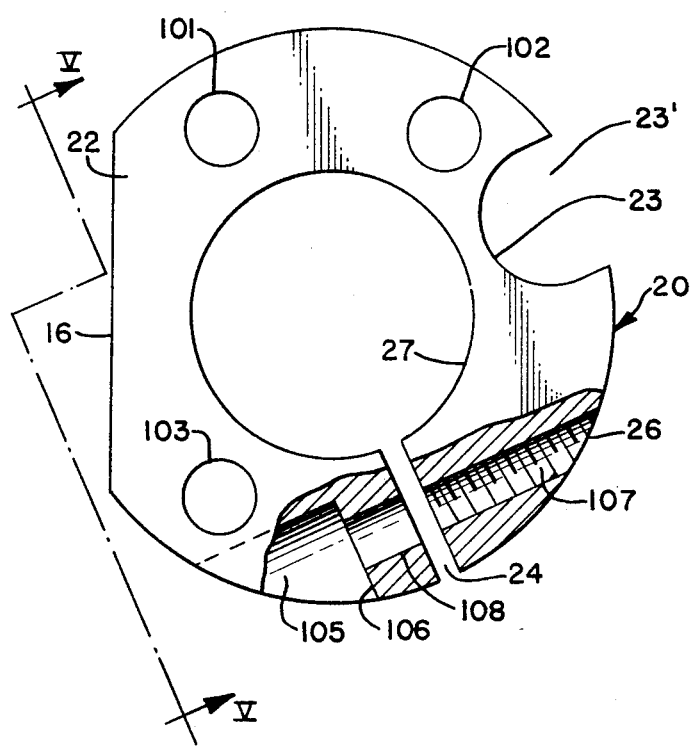
FIG. 4 is a top view of an optical fiber holder clamping member.

Referring to FIG. 1 of the drawings, there is shown a partially exploded pictorial view of an optical fiber coupler fitting in accordance with the present invention for coupling an optical fiber 35 to the light emitting face 41 of an injection laser diode. The injection laser diode may be in the form of a commercially available diode package 40 typically configured as a partially flattened cylindrical package having a cylindrical portion 43 and a flattened surface portion 42 in which the light emitting face 41 of an injection laser diode chip is disposed. Affixed to the flattened face 42 is a thin glass plate 45 from which light generated by the laser diode emerges. The laser diode package 40 is inserted in a partially flattened cylindrical slot or hole (not shown in FIG. 1) in the face 16 of a mounting fixture 10, of a generally block configuration (and hereinafter referred to as a mounting block), with glass lens 45 facing a rectangular slot 11, which is formed in face 12 of rectangular block 10 and extends from face 16 to opposite face 15. A more detailed explanation of the configuration of the mounting block, per se, will be presented below in conjunction with a description of FIGS. 2 and 3.

For providing energizing electrical contact and retaining laser diode package 40 within mounting block 10, a thin contact disc 50 made of a suitable insulator material such as epoxy board may be provided. Contact disc 50 has a circumferential shape corresponding to that of laser diode package 40 so that it may properly fit in the slot provided in mounting block 10. A circular layer 52 of a suitable conductor such as copper is formed on the side of the disc 50 facing laser diode package 40 to provide one of the energizing electrical connections to the diode. This conductive layer 52 extends through a thru-hole 53 to the opposite side of the epoxy board 51 to receive an external connection. Pressing against the face of disc 50 opposite that abutting against laser package 40 is a suitable pressure pad 60, again of a circumferential shape corresponding to that of laser diode package 40 and disc 50, so as to fit within the laser diode retaining slot in mounting block 10. Finally, a rectangularly-shaped retainer 61 having a hole 62 and a screw 63 are provided to press against pad 60 when screw 63 is inserted through hole 62 and tightened in a suitable tapped hole (not shown in FIG. 1) in mounting block 10, to thereby retain laser diode package 40 at a fixed position at one end of the laser package receiving well or slot in block 10.

A more detailed illustration of the mounting block 10 is shown in FIGS. 2 and 3. As is shown therein, face 12 of mounting block 10 has a rectangular slot 11 extending from face 15 to face 16. A first circular hole or well 131 extends from face 16 to a prescribed depth in block 10 terminating at a flattened annular land 139. From land 139 a second circular hole 132, the surface 136 of which has a slightly smaller diameter than the surface 137 of first circular hole 131, coaxially extends partially towards face 15, terminating at a flat bottom portion 135. FIG. 3 shows the manner in which laser diode package 40 may be inserted into hole 132 with the flat lens portion 45 facing rectangular slot 11 and being parallel with face 12 of mounting block 10. Also shown in FIG. 3 is tapped hole 138 which receives screw 63 (FIG. 1) for urging retainer 61 against pad 60 for securing the laser diode package 40 in hole portion 132. Tapped holes 133 and 134 may be provided to receive set screws to securely retain laser diode package 40 in place to assure proper alignment. Tapped holes 13 and 14 may be provided for suitably affixing mounting block 10 to a support housing or table, while tapped holes 141, 142, and 143 are provided to receive respective clamp retaining screws, such as 28 and 29, shown in FIG. 1, by way of which clamp 20 is securely fastened to face 12 of mounting block 10.

Referring again to FIG. 1 and also to FIGS. 4, 5, and 6, the fastening component parts for the optical fiber will be described. As is shown pictorially in FIG. 1, and in more detail in FIG. 6, an optical fiber 35 is inserted into a ferrule 34 which extends into a channel 33 of ferrule/fiber holder 30. Ferrule/fiber holder 30 includes a first cylindrical body portion 31 at one end of which is a large diameter cylindrical body portion 32. Optical fiber 35 is surrounded by ferrule 34 and extends through channel 33 to extend a specified distance beyond face 110 of the large diameter body portion 32 of holder 30 that optimizes optical coupling between the face of the photoelement and the end of fiber 35. A set screw 36 is inserted into a tapped hole 120 provided in cylindrical body portion 31 to secure the optical fiber 35 within the holder 30. The axial thickness of the large diameter portion 32 of holder 30 is less than the thickness of a central hole 27 provided in a thick slotted disc clamp 20. The diameter of hole 27 is only slightly larger than the diameter of larger diameter portion 32 of holder 30, so that holder 30 may be easily inserted into hole 27. Slot 24 extends from hole 27 to the outer surface of disc-shaped clamp 20 so as to effectively sever the essentially annular shaped clamp 20.

Figure 5:
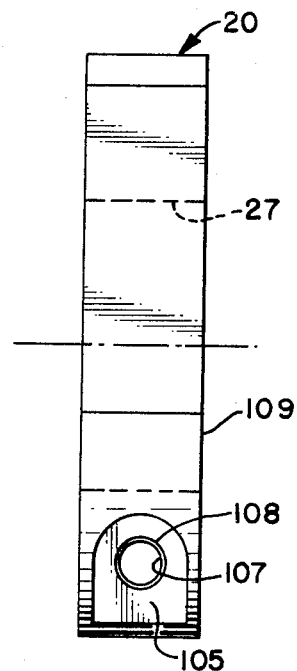
FIG. 5 is a side view of an optical fiber holder clamping member illustrated in FIG. 4.
Figure 6:
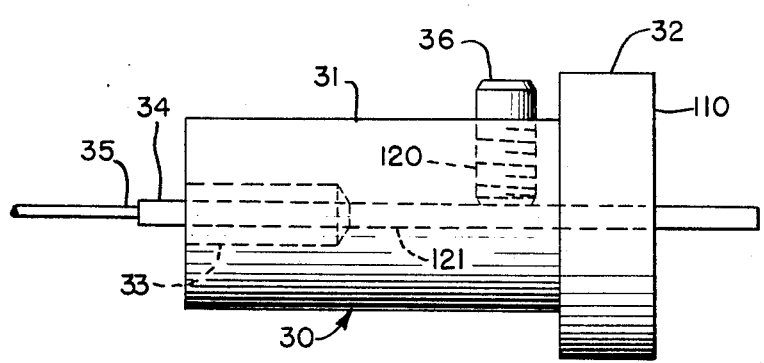
FIG. 6 is a side view of an optical fiber ferrule holder.

As is shown in detail in FIGS. 4 and 5, a tapped hole 26 extends from slot 24 into portion 107 of clamp 20, while a hole 108, coaxial with hole 26, extends from slot 24 to a flat land portion 106 of a bored-out portion 105. A suitable screw (not shown) may be inserted at bored-out portion 105 to pass through hole 108 and tightened into the tapped hole 26.

In the vicinity of tapped hole 26 is a removed portion 23' defining a reduced thickness portion 23 of clamp 20 that permits portion 107 of clamp 20 to flex about the reduced thickness portion 23 in accordance with the application of a force parallel to the axis of hole 26, and thereby adjust the size of circular hole 27. Once the head of the inserted screw comes in contact with land portion 106, further tightening of the screw will cause the opposite faces of clamp 20 defining the width of slot 24 to come closer together as portion 107 flexes about reduced thickness portion 23 and thereby, in turn, reduces the size of circular hole 27. With larger diameter body portion 32 having been inserted into circular hole 27, the result of the tightening of this screw therefore causes a tight pressure frictional engagement of the walls of hole 27 with the outer surface of larger diameter body portion 32 of holder 30, so that ferrule/fiber holder 30 is held fast within hole 27 of clamp 20. Loosening of the screw, conversely, releases the annularly directed compression of clamp 20 so that the area of circular hole 27 is no longer reduced, whereby ferrule/fiber holder 30 may be adjusted toward or away from face 109 of clamp 20 or be completely removed from hole 27.

For securing clamp 20 to mounting block 10, clamp 20 is provided with a plurality of holes 101, 102, and 103 which are generally aligned with holes 141, 142, and 143, respectively, so that the axis of ferrule/fiber holder 20, and thereby the axis of the fiber retained therein, will intersect the light emitting face of laser diode 40 when clamp 20 is affixed to mounting block 10 by respective screws inserted through holes 101, 102, and 103 and screwed into tapped holes 141, 142, and 143 respectively. The diameter of holes 101, 102, and 103 is somewhat larger than the screw diameter so as to permit a slight amount of play or slop between the inner walls of holes 101 through 103 and the outer diameter of the threads of the screws used to secure clamp 20 to mounting block 10. This slight amount of play is provided to permit adjustment of the position of clamp 20 upon mounting block 10 during the original alignment of the fiber retained within holder 30 with the face of laser diode 40. During initial fabrication and alignment, laser diode 40 is inserted and secured in mounting block 10, with the face of lens 45 parallel with the face 12 of mounting block 10, as described previously. An optical fiber 35 and its surrounding ferrule 34 are inserted into holder 30 with the end of the fiber 35 extending beyond face 110 of holder 30 a specified distance, and set screw 36 is tightened to retain fiber 35 in this position. Holder 30 is then inserted into hole 27 of clamp 20 with face 110 of holder 30 flush with face 109 of clamp 20 and a screw threaded into tapped hole 26 of clamp 20 is tightened, to reduce the size of hole 27 and cause the walls of hole 27 to come into slidable pressure engagement with the flared portion 32 of holder 30. By means of a suitable X-Y-Z positioning mechanism that engages cylindrical body portion 31 of holder 30, clamp 20 is then placed into position with face 109 resting flush against face 12 of mounting block 10 and holes 101 through 103 in alignment with holes 141 through 143. Screws with washers are inserted through holes 101 through 103 of clamp 20 and screwed into respective tapped holes 141 through 143 of mounting block 10. By appropriate positioning of the X-Y-Z system, clamp 20 may then be adjusted within the degree of play permitted by holes 101 through 103 for maximum optical coupling between laser diode 40 and optical fiber 35, using a microscope objective to look into slot 11 and appropriate measuring equipment coupled to the free-end of fiber 35. Once maximum optical coupling is achieved to thereby define the desired proper alignment, the screws are tightened into holes 141 through 143 with the screw heads urging clamp 20 into a fixed pressure engagement with mounting block 10. Once proper alignment of clamp 20 upon mounting block 10 has been achieved, fiber/ferrule holder 30 may be adjusted relative to the face of the optical element to maximize optical coupling. Then the screw threaded into tapped hole 26 is tightened, thereby reducing the size of hole 27 so as to firmly grip optical fiber holder 30. Once fiber/ferrule holder 30 is secured into hole 27 of clamp 20, alignment of optical fiber 35 with laser diode 40 is already assured by virtue of the original alignment procedure described above and the manner in which fiber/ferrule holder 30 is held with precision within circular hole 27 in clamp 20 by the pressure gripping action created by reducing the distance between the opposing faces of slot 24. Optical fiber 35 may then be removed by loosening set screw 36 in tapped bore 120 and a new fiber slipped into place, without suffering a loss of proper alignment. In this regard, it is to be noted that there may be a slight amount of offset, in a direction parallel to the optical fiber axis, of the end of fiber 35 from the face of the optical element, when a new fiber is inserted. However, this offset is substantially insignificant and does not adversely affect the originally achieved and still maintained alignment of the fiber in directions orthogonal to the fiber axis. Advantageously, in accordance with the present invention, the area of contact between the clamp 20 and mounting block 10 is considerable, extending over face 109 of clamp 20 and face 12 of mounting block 10, thereby preventing offset between the fiber retaining channel of holder 30 and the light emitting face of laser diode package 40 when holder 30 has been secured in place within compressed circular hole 27 and with face 110 of holder 30 flush with face 12 of mounting block 10.

Figure 7:
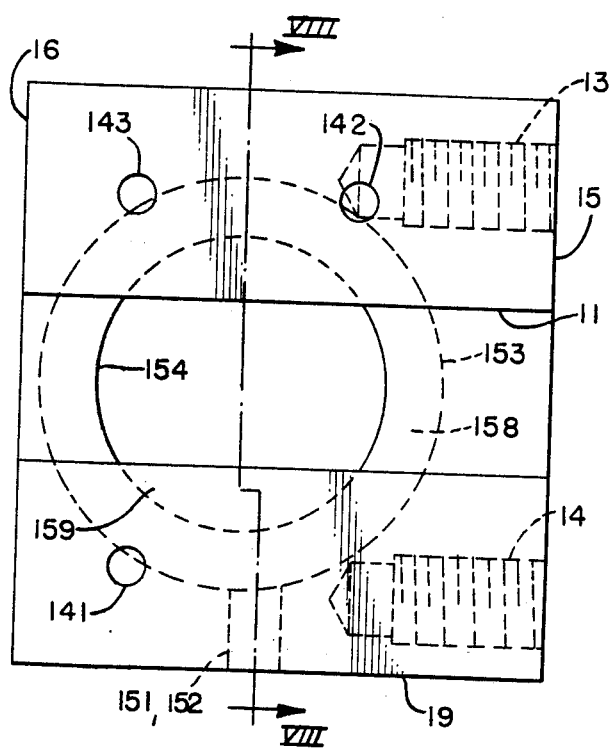
FIGS. 7 and 8 are respective front and side views of a mounting block for holding a cylindrically shaped photodiode.
Figure 8:
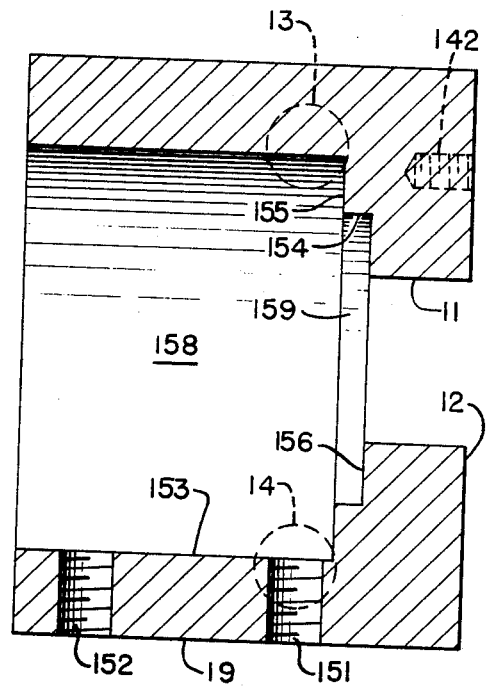
Figure 9:
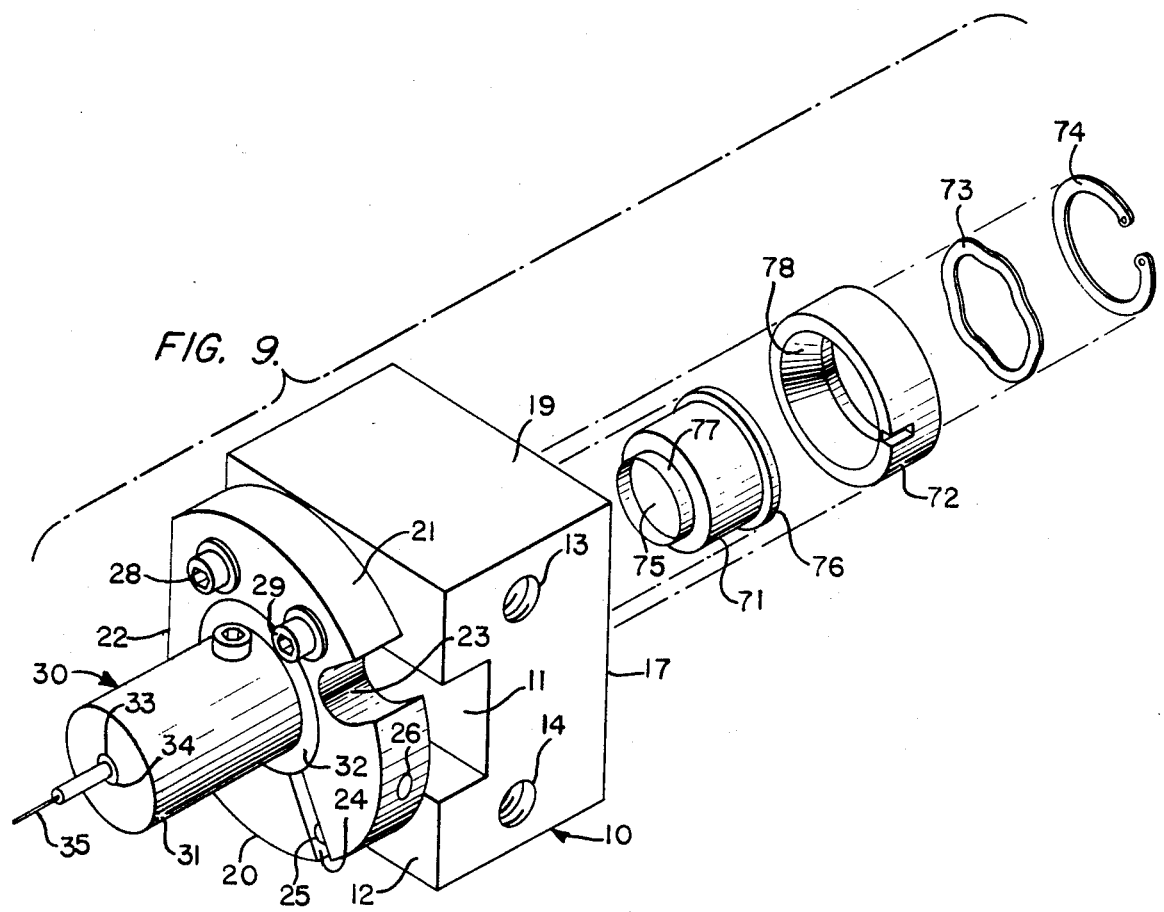
FIG. 9 is a partially exploded pictorial view of an optical fiber coupling fitting for coupling an optical fiber to a cylindrically shaped photodiode.

Referring now to FIGS. 7 through 9, the optical fiber coupler fitting of the present invention is shown in conjunction with a mounting arrangement for a cylindrically shaped photodiode package, the light sensitive surface of which may be disposed at one end of the cylindrically shaped package.

More specifically, as is illustrated in FIG. 9, a photodiode package 71 may be of a generally cylindrical configuration encasing a photodiode on the light receiving face 77 of which is disposed a window 75. The opposite end of package 71 is flared at 76. The flared portion 76 of cylindrical package 71 fits within the interior portion of a cylindrically shaped clamping ring 72, the tapered surface 78 of which is urged against the bottom of flared portion 76 of package 71 when package 71 is inserted into mounting block 10. A spring washer 73 and snap ring 74 are further provided in a serially stacked fashion and inserted into mounting block 10 to properly secure photodiode package 71 therein.

The interior configuration of mounting block 10 is shown in detail in FIGS. 8 and 9. In place of a partially flattened cylindrical slot extending transverse to face 12, (as was described above and as is illustrated in FIGS. 2 and 3 in conjunction with the laser diode package retaining configuration) for receiving the cylindrically-shaped photodiode package 71, mounting block 10 is bored out substantially coaxially with the axis of channel 34 of holder 30 when the latter is held by clamp 20, clamp 20 being affixed to face 12 of block 10 just as in the embodiment shown in FIGS. 1 through 3. A first bored or hollowed-out cylindrical portion 158 has its cylindrical wall 153 terminating at land 155. A second cylindrical hollowed-out portion 159 coaxial with the first portion 158 extends from land portion 155, having side wall 154 and terminating at land portion 156. Rectangular slot 11 extends across face 12 from face 15 to face 16 of mounting block 10 and intersects the second cylindrical portion 159. The diameter of clamping ring 72 and circular bored portion 158 of mounting block 10 substantially coincide so that clamping ring 72 properly urges and retains photodiode package 71 in position within block 10. Once photodiode package 71 has been secured within mounting block 10, fiber/ferrule holding clamp 20 may be affixed to face 12 of mounting block 10 in exactly the same manner as in the laser diode embodiment described above.

In either embodiment, the configuration of clamp 20 and the adjustable manner by which it may be properly aligned with the light coupling face of the photo element held within mounting block 10 assures continued accurate alignment between an optical fiber and the photo element, while permitting rapid replacement of optical fibers without suffering a loss of the original alignment.

As will be appreciated from the foregoing description of the optical fiber coupler fitting of the present invention, both accurate alignment and rapid replacement of an optical fiber with a light emitting or light receiving element may be effected through an arrangement which is compact and having a structural configuration that permits simplified mounting of the element containing package. Due to the large area of planar contact between the fiber holder clamp and the mounting block, relative rotation of the fiber channel axis and the light coupling face of the element is prevented. Moreover, the turning of a single screw 36 in fiber holder 30 is all that is necessary to enable rapid removal of the fiber from the face of the optical element retained in the mounting block.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. An optical fiber coupler fitting for securely coupling an optical fiber to a photo element retained within a mounting fixture comprising:
   an optical fiber holding member having a channel extending therethrough in which an optical fiber is secured;
   a clamp member having
   an aperture therethrough into which said optical fiber holding member may be inserted, and
   first means for controlling the size of said aperture so that said holding member may be inserted into said aperture and securely retained therein; and
   second means for affixing said clamp member to said mounting fixture, and thereby couple an optical fiber secured in said holding member to a photo element retained within said mounting fixture, wherein said first means comprises a slot provided in said clamp member and extending from a peripheral portion thereof to said aperture, and means for controlling the spacing between opposing faces of said slot and thereby controlling the size of said aperture.

2. An optical fiber coupler fitting according to claim 1, wherein said spacing controlling means comprises a pair of coaxial holes extending from opposite faces of said slot into said clamp member and means passing through each of the holes of said pair and engaging said member for controllably adjusting the spacing between said opposite faces.

3. An optical fiber coupler fitting according to claim 1, wherein said aperture comprises a generally circular hole and said optical fiber holding member is of a generally cylindrical configuration.

4. An optical fiber coupler fitting according to claim 1, wherein said second means comprises means for engaging said clamp member and said mounting fixture and for permitting a relatively minor displacement of said clamp member in respective orthogonal directions, each of which is transverse to the axis of the channel extending through said holding member, so that an optical fiber in said channel may be aligned with a photo element retained within said mounting fixture, said engaging means further securely affixing said clamp member to said mounting fixture once alignment has been achieved without permitting displacement of said clamp member relative to said mounting fixture.

5. An optical fiber coupler fitting according to claim 4, wherein said engaging means comprises a plurality of holes provided in said clamp, surrounding said aperture, and means, passing through said holes, for affixing said clamp to said mounting fixture.

6. An optical fiber coupler fitting according to claim 5, wherein said aperture comprises a generally circular hole and said optical fiber holding member is of a generally cylindrical configuration.

7. An optical fiber coupler fitting according to claim 1, wherein said clamp member is of a generally thick disc-shaped configuration, having a substantially planar face which abuts against the mounting fixture.

8. An optical fiber coupler fitting according to claim 7, wherein said mounting fixture has a substantially planar face against which the substantially planar face of said clamp member abuts so as to be flush therewith, and a slot extending to a prescribed depth from said face for providing access to the light coupling portion of a photo element to be coupled with an optical fiber retained by said clamp member.

9. An optical fiber coupler fitting according to claim 7, wherein said mounting fixture further includes a generally cylindrical hollowed-out portion into which said photo element is inserted, said hollowed-out portion extending to the slot in said mounting fixture, and means, coupled with said hollowed-out portion, for securing a photo element therein.

10. An optical fiber coupler fitting according to claim 9, wherein the axis of said hollowed-out portion extends in a direction parallel with the substantially planar face of said mounting fixture.

11. An optical fiber coupler fitting according to claim 9, wherein the axis of said hollowed-out portion extends in a direction orthogonal to the substantially planar face of said mounting fixture.

12. An optical fiber coupler fitting for securely coupling an optical fiber to a photo element retained within a mounting fixture comprising:

an optical fiber holding member having a channel extending therethrough in which an optical fiber is secured;

a clamp member having
an aperture therethrough into which said optical fiber holding member may be inserted, and
first means for controlling the size of said aperture so that said holding member may be inserted into said aperture and securely retained therein; and
second means for affixing said clamp member to said mounting fixture, and thereby couple an optical fiber secured in said holding member to a photo element retained within said mounting fixture, wherein
said optical fiber holding member includes means for securely retaining said fiber within said holding member and for selectively releasing said fiber from said holding member, said securely retaining and selectively releasing means extending from an outer surface of said holding member to said channel extending therethrough, and wherein
said first means comprises a slot provided in said clamp member and extending from a peripheral portion thereof to said aperture, and means for controlling the spacing between opposing faces of said slot and thereby controlling the size of said aperture.

13. An optical fiber coupler fitting according to claim 12, wherein said second means comprises means for engaging said clamp member and said mounting fixture and for permitting a relatively minor displacement of said clamp member in respective orthogonal directions, each of which is transverse to the axis of the channel extending through said holding member, so that an optical fiber in said channel may be aligned with a photo element retained within said mounting fixture, said engaging means further securely affixing said clamp member to said mounting fixture once alignment has been achieved without permitting displacement of said clamp member relative to said mounting fixture.

* * * * *